(12) United States Patent
Duncan et al.

(10) Patent No.: US 6,750,758 B2
(45) Date of Patent: Jun. 15, 2004

(54) REMOTELY CONTROLLED BEEPER AND METHOD

(75) Inventors: Timothy T. Duncan, Tucson, AZ (US); Timothy J. Crist, Tucson, AZ (US); Sean M. Hayes, Tucson, AZ (US)

(73) Assignee: Tri-Tronics, Inc., Tucson, AZ (US)

( * ) Notice: Subject to any disclaimer, the term of this patent is extended or adjusted under 35 U.S.C. 154(b) by 80 days.

(21) Appl. No.: 10/034,789

(22) Filed: Dec. 27, 2001

(65) Prior Publication Data

US 2003/0122678 A1 Jul. 3, 2003

(51) Int. Cl.$^7$ .................................................. G08B 3/00
(52) U.S. Cl. ............................... 340/384.1; 340/384.71; 181/152
(58) Field of Search .......................... 340/384.1, 384.7, 340/384.71; 181/152, 177; 367/139, 151

(56) References Cited

U.S. PATENT DOCUMENTS

| | | | | |
|---|---|---|---|---|
| 3,970,879 A | * | 7/1976 | Kumon | 310/324 |
| 4,183,017 A | * | 1/1980 | Sims | 340/384.7 |
| 4,399,432 A | | 8/1983 | Lunn | 340/573 |
| 5,196,829 A | * | 3/1993 | Janis | 340/574 |
| 5,465,687 A | * | 11/1995 | Custer | 119/719 |
| 5,726,396 A | | 3/1998 | Erath | 181/152 |
| 5,986,540 A | * | 11/1999 | Nakagaki et al. | 340/384.7 |
| 6,069,844 A | * | 5/2000 | Williams | 367/139 |
| 6,359,549 B1 | * | 3/2002 | Lau et al. | 340/384.71 |

OTHER PUBLICATIONS

"Tri–Tronics Upland Special Owner's Manual", Tri–Tronics, Inc., pp. 1–32, including cover pages of booklet.
"Tri–Tronics Model BC 12 Beeper Collar Owner's Manual", Tri–Tronics, Inc., pp. 1–24, including cover pages of booklet.
"Tri–Tronics Accessory Beeper Owner's Manual", Tri–Tronics, Inc., pp. 1–9, including cover pages of booklet.
"DT–Good Dog ST50, ST60, ST300 and ST302", D. T. Systems, Inc., 2 pages.

* cited by examiner

Primary Examiner—John Tweel
(74) Attorney, Agent, or Firm—Cahill, von Hellens & Glazer P.L.C.

(57) ABSTRACT

A collar-mounted animal training device includes a piezo-electric transducer device (6) attached to a mylar cone acoustic element mounted in a transducer housing (5) configured as a resonant sound port. The piezoelectric transducer is driven by circuitry including a microcontroller (31), a voltage booster circuit (34), and driver circuitry coupled to the booster circuit and producing a boosted drive signal to the piezoelectric device (6). The microcontroller stores data representing a plurality of sequential segments each having a start and stop time and a start and stop frequency. The microcontroller sequentially produces a plurality of output signals having a start and stop times and frequencies.

13 Claims, 8 Drawing Sheets

FIG. 3
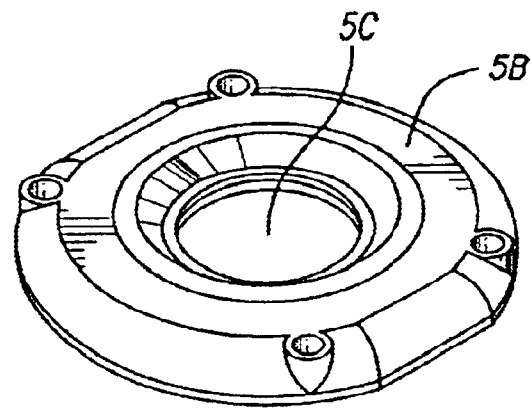
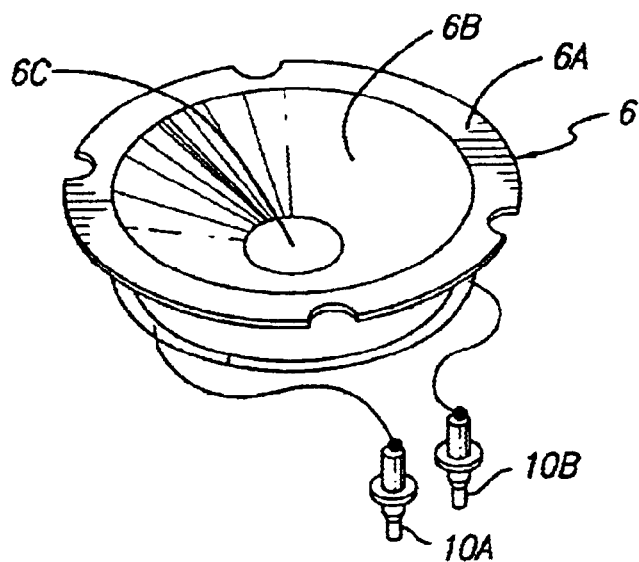
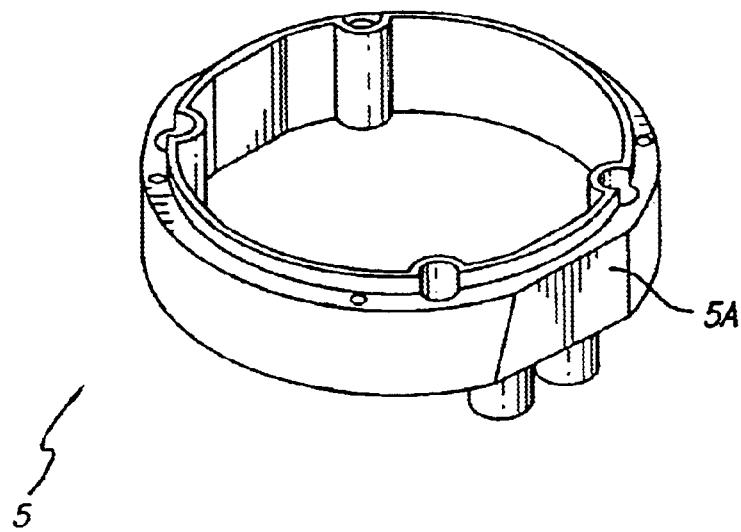

REMOTELY CONTROLLED BEEPER AND METHOD

BACKGROUND OF THE INVENTION

The invention relates to collar-mounted audible beepers used for dog training, wherein the beepers produce predetermined audible sounds that enable a trainer or hunter to be aware of the location and movement of the dog(s) on which such a beeper is mounted, and more particularly to improvements which increase reliability of collar-mounted beepers and which also enable them to emit realistic natural sounds, such as the sound of a hawk screeching.

One of the assignee's prior products, the Tritronics BC 12 Beeper Collar 20 shown in FIG. 6, includes a collar 3 supporting a horn 50 attached to a top portion of the collar 3 and a housing 21 attached to the bottom portion of the collar. The horn 50 includes a quarter watt speaker (not shown) and directs the sound upwardly out of the opening 50A, so the emitted sound is directed away from the ears of the dog wearing the collar 3, so as not to distract it. The housing 21 contains the electronic circuitry and batteries which accomplish the operation that provides the beeping operation. The device 20 is a lightweight, battery-powered device designed for use with a dog working in heavy brush or other conditions were in the dog is out of sight or difficult to see. The BC 12 Beeper Collar 20 produces audible beeping sounds which indicate whether a dog is in a "range/point" mode or a "point" mode. In the range/point mode, the beeper unit beeps every five seconds while the dog is moving, and beeps once per second while the dog is stationary. If the beeper unit is set in the point mode, the beeper unit is silent until the dog stops moving, and then beeps once per second. The BC 12 Beeper Collar 20 has the capability of producing two different beeping patterns, to indicate whether the dog wearing it is a first dog or a second dog, by setting the beeper unit 20 to produce a first kind of beeping sound or a second kind of beeping sound, respectively. The Tritronics BC 12 and other prior beeper units include a collar-mounted housing positioned at the back of the dog's neck, which is counterbalanced by a rather heavy circuit/battery unit attached to the collar beneath the dog's neck and connected by wires woven through the collar to the speaker in the collar-mounted housing positioned at the back of the dog's neck. The housing 21 contains the operative electronic circuitry of the beeper unit 20 and the large, heavy batteries required to power of the circuitry and drive the quarter watt speaker. A "horn" 50 and speaker therein are mounted on top of the housing 21.

The horns of this and other prior beeper units typically have been 2 to 3 inches in height, and often are broken off of the beeper units when the dog runs through heavy brush or the like. The prior collar-mounted beeper units have used speakers, which necessitates the use of high-power circuitry and large batteries, and hence large size and weight of the circuit/battery unit 21 in the need to locate it on the portion of the collar below the dog neck and the need to route wires to the speaker in horn 50. Breakage of the speaker wires has been a problem of the BC12 device.

Another of the assignee's prior products, the "Tritronics Accessory Beeper", is designated by reference numeral 20A in FIG. 7. It differs from the beeper unit 20 shown in FIG. 6 in that the horn 53 in FIG. 7 attached to the top of the housing 52 includes a piezoelectric transducer instead of a speaker, and also includes the circuitry and battery, eliminating the need for the speaker wires mentioned above in the BC12 device. The height of horn 53 is one inch, which is substantially shorter than the horn 50 in FIG. 6. The beeper unit 1A of FIG. 7 can be mounted on an upper portion of a collar 3 which supports a circuit/stimulus unit (not shown) mounted on a lower portion thereof.

Yet another of the assignee's prior products, it's UPLAND SPECIAL dog training product, includes a stimulus/receiver unit, a remote transmitter, and a beeper unit similar to the above described Accessory Beeper 20A but having the additional capability of allowing the remote transmitter to remotely turn the beeper unit on and off.

Another prior collar-mounted beeper unit (commercially available from Lovett's Electronics of St. Brazil, Ind.) produces a hawk screeching sound which is a poor representation of an actual hawk screeching sound. That unit repetitively switches the power to the sound-producing circuit on and off, repetitively charging up internal capacitance and discharging it through the sound-producing circuit in order to produce the hawk screeching sound. (A hawk screeching sound feature is desirable because hawks are predators, and a sufficiently realistic hawk screeching sound tends to cause some game birds to "freeze". This allows a trained hunting dog an opportunity to approach the birds and deliberately flush them out, giving the hunter a good opportunity to aim and shoot. Also, the hawk screeching sound is considered by some to be more pleasant than the beeping sound usually associated with prior collar-mounted beeper units.)

U.S. Pat. No. 4,399,432 issued Aug. 16, 1983 to Lunn discloses a beeper unit for use as an aid in locating a hunting dog and providing audible information as to whether the dog is moving or stationary. The electronic circuitry includes mercury switches responsive to movement of the dog so as to cause the beeper unit to produce different audio signals when the dog is moving and when it is stationary.

Thus, there is an unmet need for an improved collar-mounted audible beeper unit which solves the above described problems of the closest prior art devices. There also is a need for a low-cost way of creating realistic sounds including high-frequency components, such as a hawk scream, which does not require a large amount of memory, wherein the high-frequency components are compatible with a piezoelectric transducer.

SUMMARY OF THE INVENTION

Accordingly, it is an object of the invention to provide an improved collar-mounted beeper unit which overcomes the foregoing problems of the prior art.

It is another object of the invention to provide an improved, realistic-sound-producing algorithm and circuitry for use in an animal training device.

It is another object of the invention to provide a collar-mounted beeper unit which provides a more realistic hawk screeching sound or the like than has been achievable in the prior art.

It is another object of the invention to provide a device and technique which provides a realistic replication of a pre-recorded sound while avoiding the problems associated with prior wavelength file techniques.

It is another object of the invention to provide a collar-mounted beeper unit and technique which provides a realistic replication of a pre-recorded sound while avoiding the problems associated with harmonic resonance points of the piezoelectric transducer encountered by prior wavelength file techniques.

It is another object of the invention to provide a more reliable, less expensive collar-mounted beeper unit than has been accomplished in the prior art.

It is another object of the invention to provide an improved collar-mounted beeper unit without using a flyback transformer.

It is another object of the invention to provide a reliable, inexpensive collar-mounted beeper unit which produces sound with the quality of a speaker, but without requiring the power consumption of a speaker and not having the poor sound quality of prior beeper units utilizing piezoelectric sound transducers.

Briefly described, and in accordance with one embodiment thereof, the invention provides a collar-mounted animal training device including a housing (2) supported by a collar (3). A piezoelectric transducer device (6) is attached to the housing (2). The piezoelectric transducer device (6) includes a piezoelectric transducer (6C) and a mylar cone acoustic element (6B) having a base portion connected to the piezoelectric transducer (6C). A transducer housing (5) for enclosing the piezoelectric transducer device (6) includes a hollow cylindrical section (5A) having an upper edge portion supporting an annular peripheral portion (6A) of the mylar cone acoustic element (6A) of the mylar cone acoustic element (6B) and a cover (5B) attached to cover the cylindrical section (5A). The cover has an opening (5C) surrounded by an annular portion 10 which clamps the annular peripheral portion (6A) of the mylar cone acoustic element (6B) between the cover (5B) and the upper edge of the cylindrical section (5A). A circuit (30) enclosed within the housing (2) includes first and second terminals connected to a first terminal (10A) and a second terminal (10B) of the piezoelectric transducer (6C), the circuit (30) being configured to produce drive signals causing the piezoelectric transducer device (6) to emit a predetermined sound. The circuit (30) includes a microcontroller (31), a voltage booster circuit (34), and driver circuitry (35,36), the microcontroller (31) having a control output (33) coupled to a control input of the voltage booster circuit (34). The voltage booster circuit is powered by a battery voltage ($V_{BATT}$) and operates to produce a boosted battery voltage ($V_{BOOSTED}$) when the voltage booster circuit (34) is enabled by the control output (33) of the microcontroller (31). The microcontroller (31) also produces an output signal (32) applied as an input to the driver circuitry (35,36) and the driver circuitry produces an output signal applied to a terminal (10A) of the mylar cone piezoelectric device (6). In the described embodiment, the driver circuit (35,36) includes a high side driver circuit (35) receiving the output signal (32) of the microcontroller (31) as an input and producing an output signal referenced to the boosted battery voltage on the terminal (10A) of the mylar cone piezoelectric transducer device (6). The driver circuit (35,36) also includes a low side driver circuit (36) operative in response to the control signal to produce an output on the terminal (10A) of the mylar cone piezoelectric transducer device (6). The microcontroller (31) includes a memory adapted to store data representative of an animal sound and a program configured to produce the control signal (32) so as to cause the mylar cone piezoelectric device (6) to produce a realistic reproduction of the animal sound. In the described embodiment, the program is configured to cause the microcontroller (31) to store data representing the animal sound in the form of a plurality of sequential segments, each segment including at least one start frequency and one corresponding to stop frequency and to store the duration for that segment, and wherein the program is also configured to cause the microcontroller (31) to sequentially produce a plurality of output signals having start frequencies and end frequencies and durations determined by stored data corresponding to that segment corresponding to the plurality of sequential segments.

In another described embodiment, the invention provides a sound producing device including a piezoelectric transducer device (6) attached to a mylar cone acoustic element mounted in a transducer housing (5) configured as a resonant sound port, a microcontroller (31), a voltage booster circuit (34) coupled to the microcontroller, and driver circuitry coupled to the booster circuit and the microcontroller for producing boosted sound signals to the piezoelectric device (6). An algorithm and data are stored in the microcontroller. The data represents a plurality of sequential sound segments each having a start time and stop time and a start frequency and stop frequency such that the microcontroller produces a plurality of sequential output signals as an input to the driver circuit. The sequential output signals each have corresponding start times and stop times and start frequencies and stop frequencies, causing the driver circuit and the piezoelectric transducer device to sequentially generate sounds having the corresponding stored start times, stop times, and frequencies.

In another embodiment, the invention provides a sound producing device in technique wherein an algorithm and data are stored in a memory associated with a processor. The data represents a plurality of sequential sound segments each having a start time and stop time and a start frequency and stop frequency such that the processor produces a plurality of sequential output signals as an input to the driver circuit. The sequential output signals each have corresponding start times and stop times and start frequencies and stop frequencies, causing a sound transducer device to sequentially generate sounds having the corresponding stored start times, stop times, and frequencies during the durations of the various segments, respectively.

BRIEF DESCRIPTION OF THE DRAWINGS

FIG. 3 is an exploded view of the horn cover, sound transducer, and horn base portion of the beeper unit of FIG. 1.

DETAILED DESCRIPTION OF THE PREFERRED EMBODIMENTS

Figure 1:
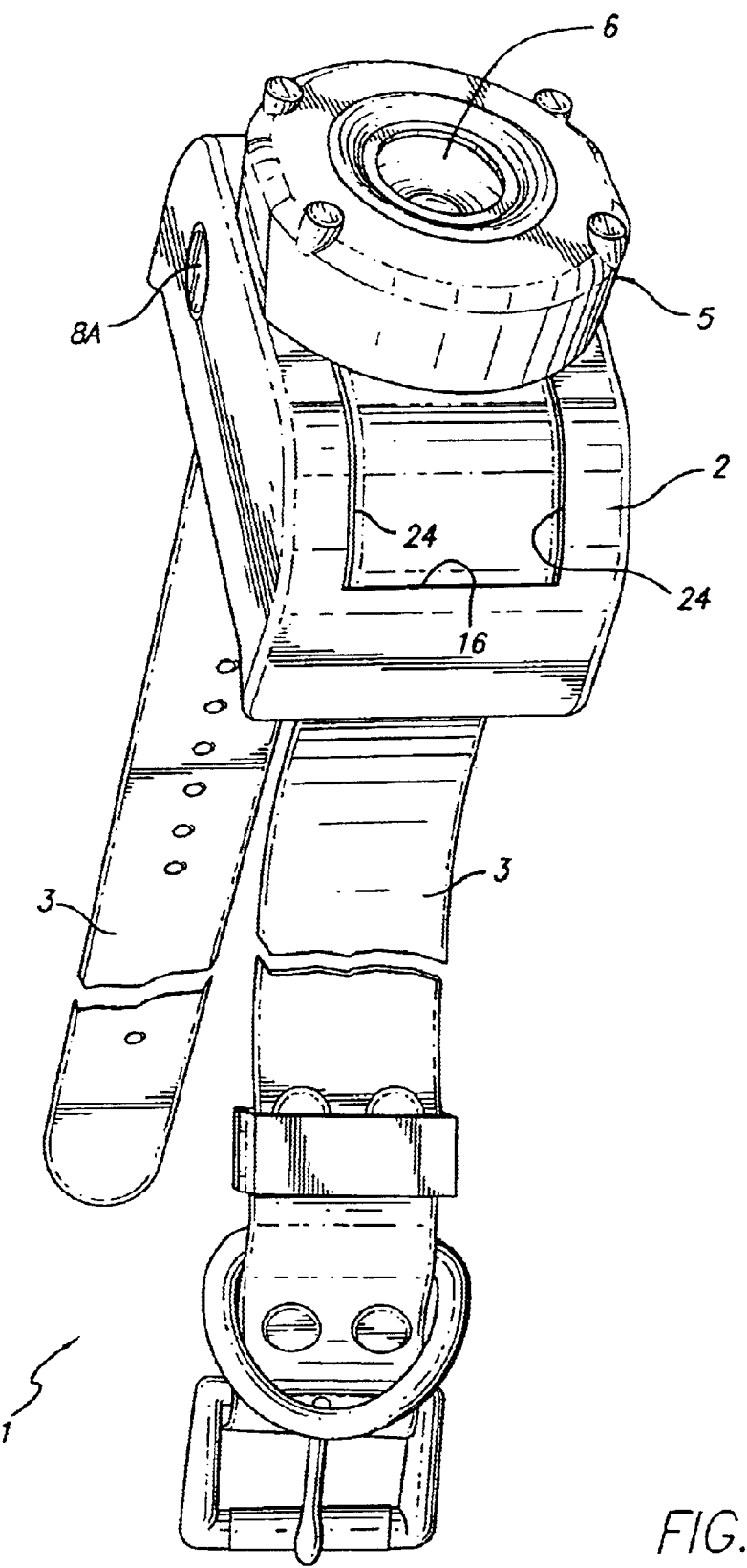
FIG. 1 is a perspective view of a collar-mounted beeper unit of the present invention.
Figure 2:
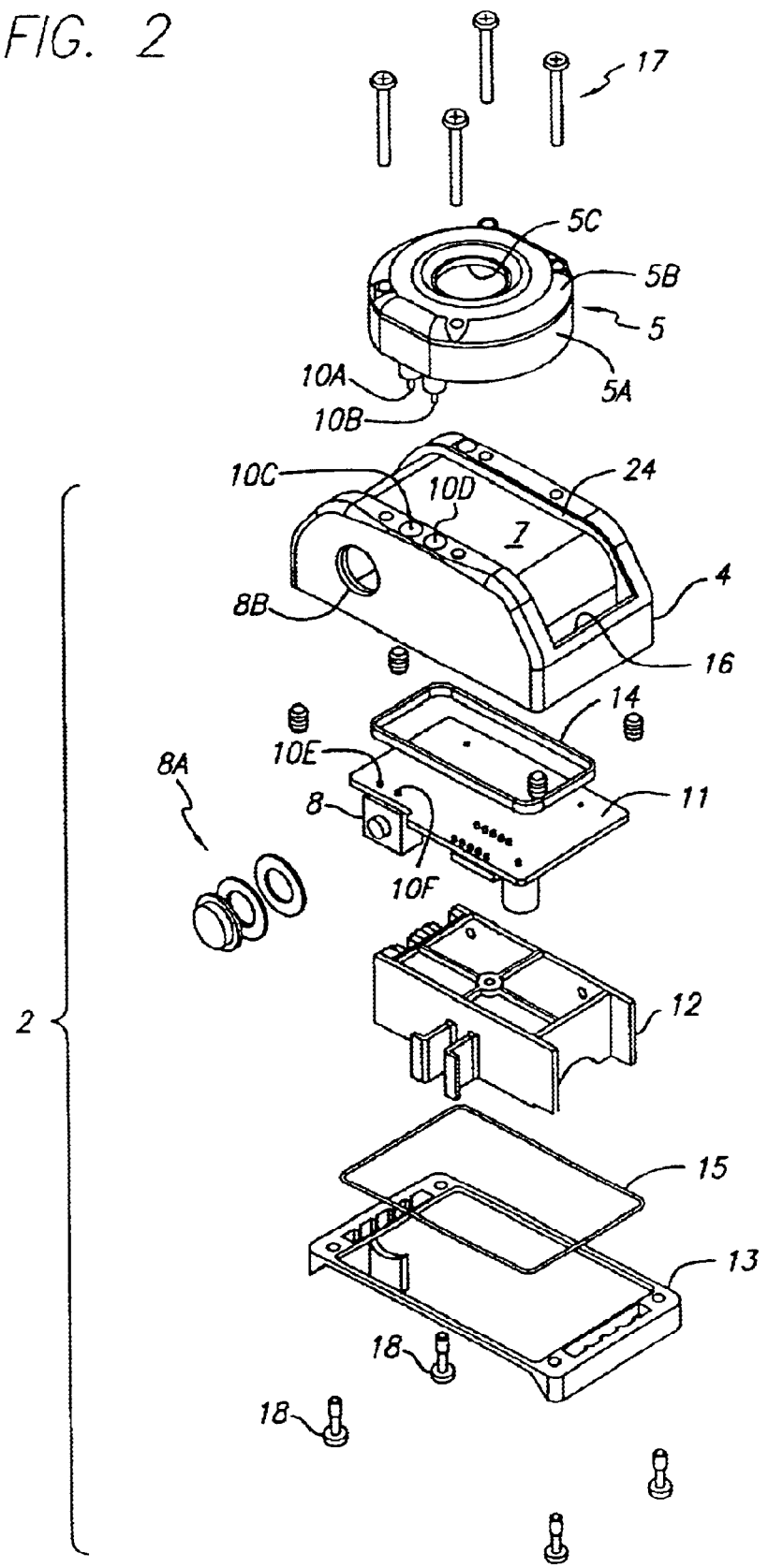
FIG. 2 is an exploded view of the beeper unit of FIG. 1.

Referring to FIGS. 1–3, the beeper unit 1 includes a housing 2 with openings through which a collar 3 extends.

A "low-profile" removable horn 5 contains a piezoelectric device 6 including a mylar cone element 6B which is attached to a dual-sided ceramic piezoelectric transducer 6C. This piezoelectric device is commercially available as part number I-25/W from Ningbo East Electronics Limited, No. 12, Lane 722, Sangtian Road, Garden Ningbo, China. Housing 2 includes a pair of slots, including a front slot 16 and a similar rear slot (not shown) through which the collar 3 extends. Collar 3 lies in a wide groove having a recessed bottom surface 7 and opposed parallel sides 24. An on/off switch 8A in the left side of housing 2 can be used to manually turn beeper unit 1 on or off.

FIG. 2 is a partial exploded view of the housing 2 and horn 5. Referring to FIGS. 2 and 3, horn 5 includes a horn base 5A and a removable horn cover 5B having an opening 5C therein to allow passage of sound produced by the mylar cone piezoelectric device 6. Horn 5 is attached by four screws 17 into threaded holes in the upper edges of a hollow housing 2.

Horn 5 includes the piezoelectric transducer 6 having the mylar cone section 6B supported by an annular flange 6A. Piezoelectric transducer 6 is electrically connected by a pair of conductors to first and second electrical contact elements 10A and 10B, respectively. Contact elements 10A and 10B contact conductive pads 10C and 10D of FIG. 2, respectively, when horn 5 is securely attached to housing 2 by the screws 17. The flange 6A of mylar cone piezoelectric device 6 is supported on a shallow cylinder 5A. Above mentioned cover 5B clamps annular flange 6A between the peripheral lower surface of cover 5B and the annular outer upper edge surface of cylinder 5A.

The use of piezoelectric transducer 6C in combination with mylar cone 6A and the acoustic chamber formed by horn base 5A and cover 5B, with the diameter of the opening or port 5C selected to be compatible with a range of sound frequencies to be emitted by piezoelectric transducer 6C, results in a "resonant port" or "Helmholtz resonator". This provides the benefit of a higher achievable peak sound volume and better quality sound, especially at low frequencies, than has been previously available for any known collar mounted beeper unit. The combination of piezoelectric transducer 6C and mylar cone 6B more accurately reproduces natural sounds and harmonics than a piezoelectric device without the mylar cone, and produces better frequency response in the low end of the audio frequency spectrum without decreased frequency response at higher frequencies. The use of piezoelectric transducer 6C in combination with mylar cone 6B also results in a waterproof sound transducer structure. The combined piezoelectric transducer 6C and mylar cone 6B is capable of automatic removal of water and debris that accumulates thereon, because vibration of the mylar cone during sound production ejects water and/or debris that occasionally fills the volume defined by mylar cone 6B. Furthermore, the use of piezoelectric transducer 6C in combination with mylar cone 6B results in a sound transducer that is more robust and durable than the speaker units utilized in similar prior beeper units.

Referring again to FIG. 2, collar 3 passes through a pair of slots 16 and over the recessed collar support surface 7, and is tightly clamped against the recessed surface 7 when horn 5 is properly installed on housing 2, to prevent housing 2 from sliding on the collar 3 when it is properly tightened along neck of the dog.

A printed circuit board 11 is installed inside housing 2 and is sealed thereto by means of an O-ring gasket 15. A switch module 8 attached to the lower surface of the circuit board 11 enables a control signal to be applied by conductors 10E and 10F to conductive pads 10C and 10D, respectively, to control the sound emitted by mylar cone piezoelectric device 6. Element 12 is a battery holder disposed underneath the circuit board 11 within housing. A gasket 15 provides a seal between the bottom peripheral edge portion of housing 2 and the top surface of a battery cover 13. Bottom plate 13 is attached to the bottom edge of housing 2 by screws 18.

An advantage of the modular horn 5 being removable is that other useful devices can be mounted on housing 2 and controlled by electronic circuitry on printed circuit board 11.

Figure 4A:
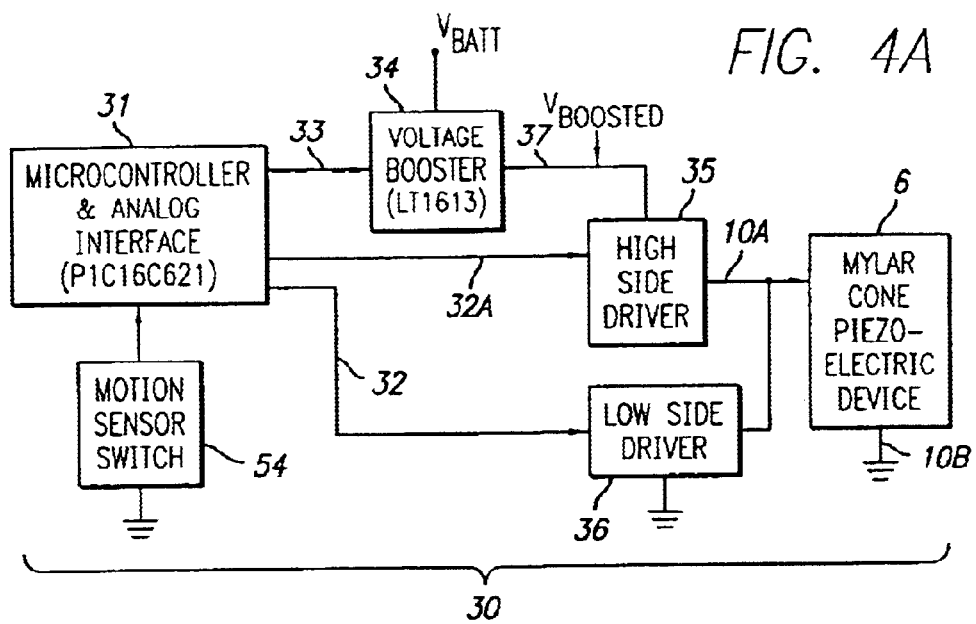
FIG. 4A is a block diagram of electronic circuitry included in the beeper unit of FIG. 1.
Figure 6:
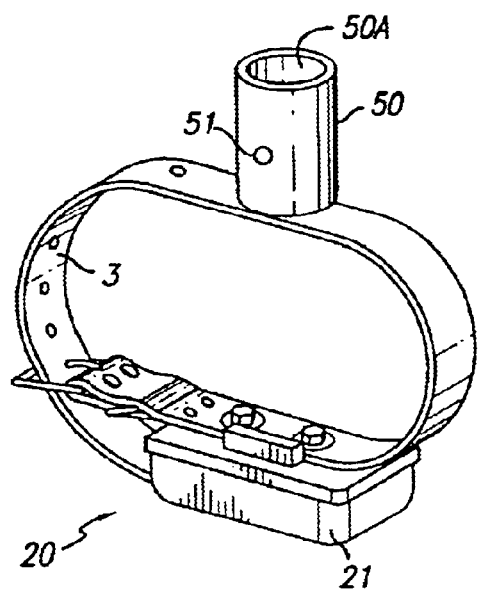
FIG. 6 is a perspective diagram of a prior art collar-mounted beeper device.
Figure 7:
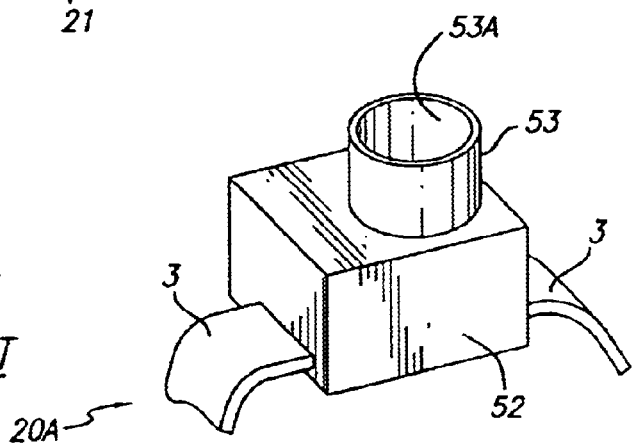
FIG. 7 is a perspective diagram of another prior art collar-mounted beeper device.

Referring to FIG. 4A, circuitry 30 on printed circuit board 11 includes an eight-bit microcontroller 31 which executes the subsequently described sound-producing algorithm to produce the signals required on conductors 10A and 10B to cause piezoelectric transducer 6 to reproduce the desired realistic hawk screech. Microcontroller 31 includes a microprocessor and memory, and can be a model number PIC16C621 which is commercially available from Microchip Corp., of Chandler, Ariz. Microcontroller 31 produces a control signal on conductor 33 to enable a voltage booster circuit 34 to produce a boosted supply voltage $V_{BOOSTED}$ on conductor 37, which is connected to the supply terminal of a high side driver circuit 35. Microcontroller 31 produces a digital output on conductor 32, which is applied to an input of a low side driver circuit 36, and also produces a digital output on conductor 32A which is applied to an input of a high side driver circuit 35. High side driver circuit 35 is referenced to the boosted battery voltage $V_{BOOSTED}$, and low side driver circuit 36 is referenced to ground.

Figure 4B:
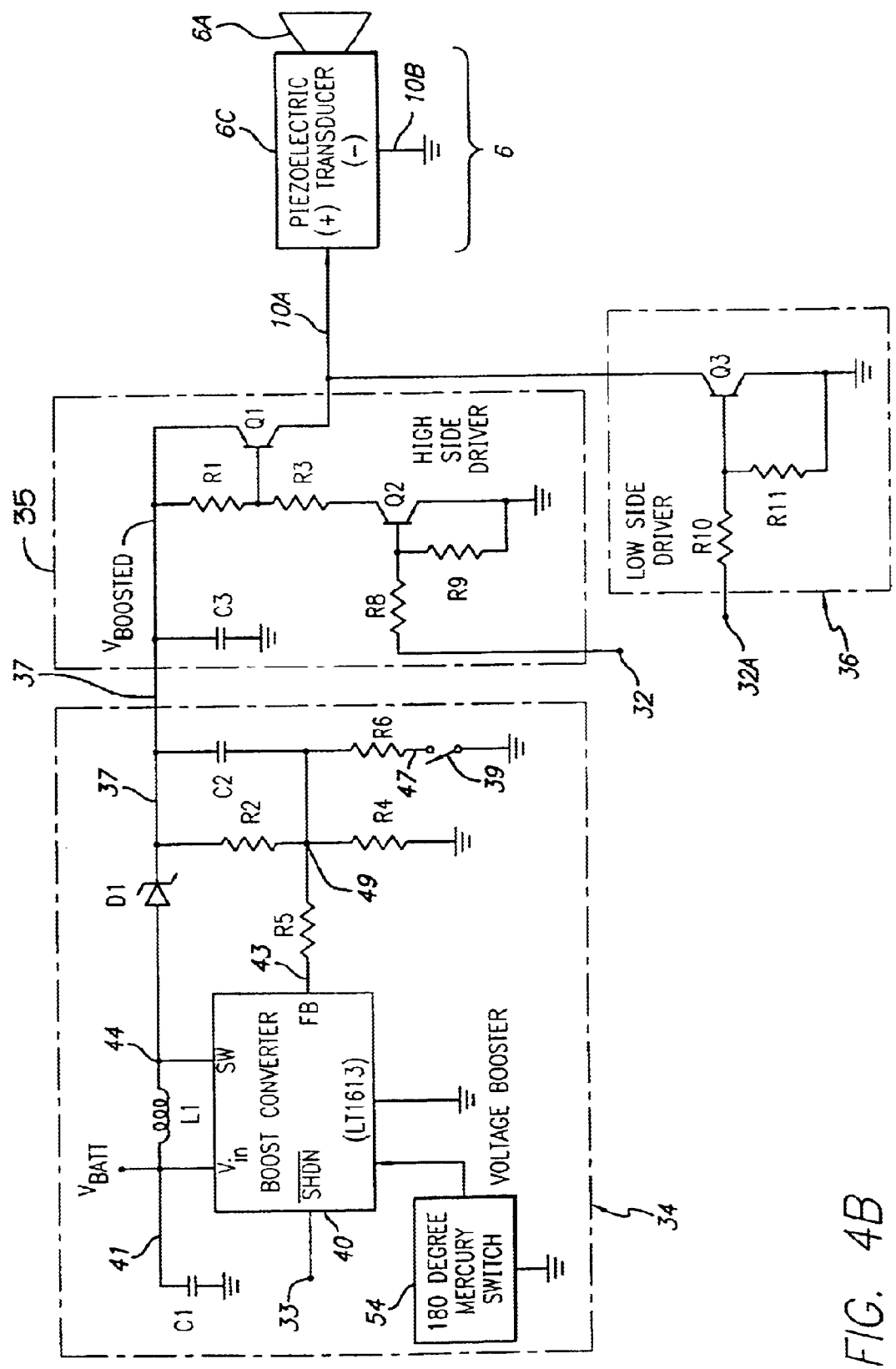
FIG. 4B is a schematic diagram of electronic circuitry in the block diagram of FIG. 5A.

Referring to FIG. 4B, voltage booster circuit 34 includes a boost converter circuit 40, which can be an LT1613, which is commercially available from Linear Technologies Inc. A "shutdown" input of circuit 40 receives a control signal on conductor 33 to selectively enable circuit 40 and its associated circuitry to produce a boosted voltage on conductor 37, or to shut voltage booster circuit 34 down. Circuit 40 receives the battery voltage $V_{BATT}$ on conductor 41, which is connected to the Vin terminal of circuit 40. An inductor L1 is connected between conductor 41 and a conductor 44 which is also connected to a switching output SW of circuit 40 and to the anode of a zener diode D1. The cathode of Zener diode D1 is connected to the conductor 37 on which the boosted output voltage $V_{BOOSTED}$ is produced when the circuit 40 is enabled. A ground reference terminal of circuit 40 is connected to ground. A feedback input FB of circuit 40 is connected by conductor 43 to a first terminal of a resistor R5, the other terminal of which is connected by conductor 44 to a first terminal of a resistor R2, a first terminal of a resistor R4, a first terminal of a resistor R6, and to a first terminal of a capacitor C2. The second terminal of resistor R4 is connected to ground. The second terminal of resistor R2 is connected to conductor 37, as it is the second terminal of capacitor C2. The second terminal of resistor R6 is connected by conductor 47 to a switch 39 that couples conductor 47 to ground. If switch 39 is open, the feedback voltage on conductor 43 to boost circuit 40 is maximized, and therefore the maximum sound volume of piezoelectric transducer is obtained.

Still referring to FIG. 4B, high side driver circuit 35 includes a capacitor C3 connected between voltage booster circuit output conductor 37 and ground. High side driver circuit 35 also includes a resistor R1 connected between conductor 37 and the base of a PNP transistor Q1 having its emitter connected to conductor 37 and its collector connected to the (+) terminal 10A of piezoelectric transducer 6, the (−) terminal 10B of which is connected to ground. The base of transistor Q1 also is connected to one terminal of a resistor R3, the other terminal of which is connected to the collector of an NPN transistor Q2 having its emitter connected to ground. The base of transistor Q2 is coupled by a resistor R8 to conductor 32, and also is coupled by a resistor R9 to ground.

Low side driver circuit 36 includes an NPN transistor Q3 having its collector connected to conductor 10A of piezoelectric transducer 6 and its emitter connected to ground. The base of transistor Q3 is coupled by a resistor R10 to conductor 32A, which is connected to a digital output of microcontroller 31. The base of transistor Q3 also is coupled to ground by a resistor R11. Low side driver 36 and high side driver 35 function together as a push-pull driver circuit, the output 10A of which drives piezoelectric transducer 6C.

The voltage-boosted output signals produced by high side driver circuit 35 and low side driver circuit 36 are applied to the (+) terminal 10A of piezoelectric transducer 6.

The above described beeper unit 1 includes a "stationary mode" which detects if the dog is moving in response to a 180 degree mercury switch 54 shown in FIG. 4A. In the stationery mode, beeper unit 1 is set to produce either the above described simulated hawk screech sound or a conventional beeping sound, to indicate that the dog is "on point", i.e., pointing at a game bird. Beeper unit 1 also includes a "range mode" that detects movement in response to a signal from mercury switch 54 indicating that the dog is moving. Beeper unit 1 can be set so that in the range mode it either produces no sound at all or produces one of several selectable sounds that are different than either the above mentioned hawk screech sound or beeping sound that are associated with the stationery mode.

The mercury switch 54 (in FIG. 4A), which is used to detect movement of the dog, can be a model Series 4, commercially available from Signal Systems International Inc. of Lavallette, N.J. It provides a signal that indicates if the dog is moving, irrespective of any rotation of the collar around the neck of the dog.

Unlike the prior art, which uses a flyback transformer to provide voltage applied to the piezoelectric transducer, resulting in overvoltages that may damage the piezoelectric transducer, the circuitry of FIGS. 4A and 4B includes voltage booster circuit 34 that boosts the output of a conventional 9 volt battery to a value of $V_{BOOSTED}$ equal to approximately 33 volts, which is substantially less than 40 to 50 volts applied across the piezoelectric transducer by the prior art flyback transformers. This avoids the need to provide clamping circuits to prevent overvoltages from being applied to the piezoelectric transducers.

Figure 5A:
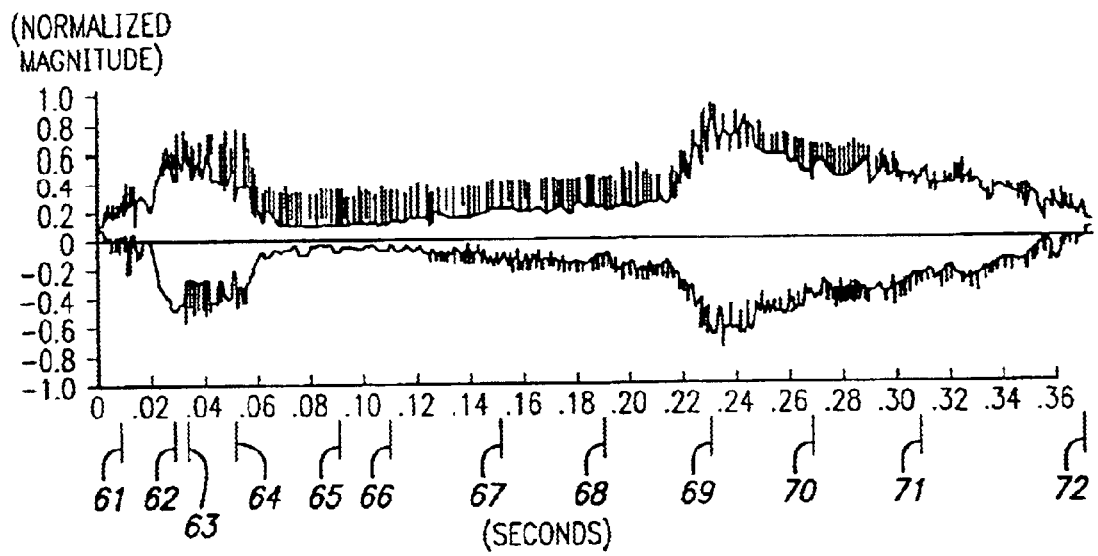
FIG. 5A is an acoustic graph of a single scream of a Redshouldered Hawk.

FIG. 5A shows an acoustic graph of a single sampled scream of a Redshouldered Hawk. The data represented by the acoustic graph of FIG. 5A can be obtained in various ways. In this case, the information in the acoustic graph of FIG. 5A is a selected one of many consecutive sampled Redshouldered Hawk sounds which were downloaded from the North American Bird Sounds Web site: www.naturesongs.com/falcstri.html#1falc. The downloaded data representing the consecutive hawk sounds were loaded into a conventional sound wave editing software program, such as the "GoldWave" program which is commercially available from GoldWave Inc. of Saint John's, Newfoundland, Canada. Next, the data representing a single typical scream was selected from the numerous downloaded samples to provide the acoustic graph of FIG. 5A, which is a waveform that represents the sequence of sounds constituting a single hawk scream.

Various sound component starts and stops within various sequential "major sections" of the waveform of FIG. 5A were selected in the following way. The time scale of the acoustic graph of a portion of the FIG. 5A waveform was expanded in order to provide an easily understandable visual representation of the various major sound components of the single hawk scream. The sampling of the audio waveform level per unit time was reduced from signed 16 bits words to signed eight bits words in order to allow a fast Fourier transform operation on the sampled data to be performed.

The sequential "major sections" of the waveform of FIG. 5A are indicated by reference numerals 61–72. Each major section includes one or more sound components of increasing frequency, decreasing frequency, or constant frequency. The data corresponding to the individual major sections were "looped" and presented as inputs to a conventional FFT analyzer. The data was "looped" in order to provide the multiple samples required to allow a fast Fourier transform (FFT) analysis to be performed. The FFT analysis was accomplished with a conventional FFT analyzer in a 54659B Measurement Module that is commercially available from Agilent Technologies.

Figure 5B:
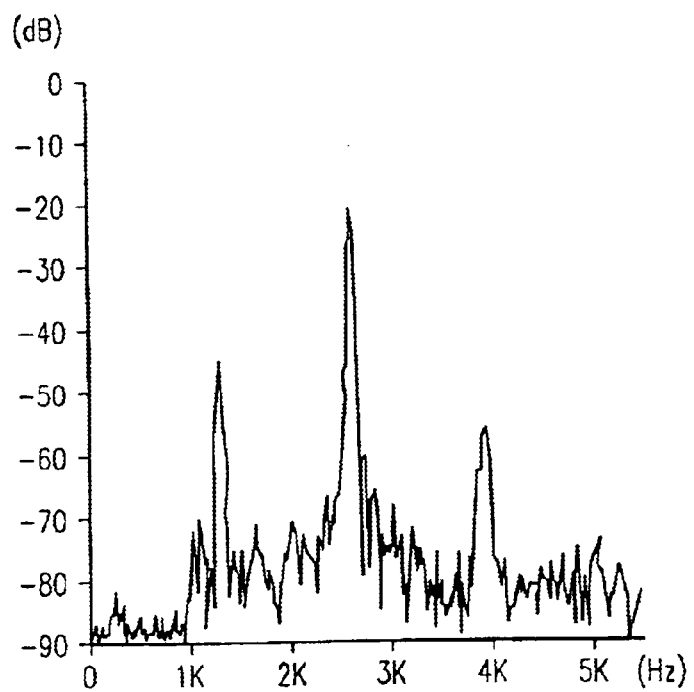
FIG. 5B is a graph illustrating the result of a fast Fourier transform analysis of a segment of the graph of FIG. 5A.

An FFT analysis then was performed to identify and record one, two, or three primary frequency components for each "major section" and also to identify and record the magnitudes of the primary frequency components. The graph shown in FIG. 5B illustrates the results of an FFT analysis of a typical major section such as segment 61–62 or 62–63, etc. of waveform of FIG. 5A. Each major section that can be visually seen by expanding the waveform of FIG. 5A is repetitively looped and measured using the FFT analyzer as described above. The frequency and magnitude of each of the primary frequency components at the beginning and also at the end of each major section then were assembled into a corresponding subroutine, referred to as a submodule. Trends which appear in the major frequency components of each "module" of the single hawk sound waveform can be recognized from the results of the FFT analysis. Such frequency component "trends" within a module can include drifting of a frequency, i.e., increasing or decreasing of the frequency. There might be only a single major frequency component within a module, or there might be two or three major frequency components within the module, and each of the major frequency components might be increasing, decreasing, or remaining steady, irrespective of any other major frequency components.

The submodules were assembled into a "major module" which is stored in, called up by, and be executed by microcontroller 31. Microcontroller 31 then can sequentially execute the submodules to cause the piezoelectric transducer 6 to reproduce the original hawk sound corresponding to the waveform of FIG. 5A.

The term "major module" as used herein refers to "submodules" or sound generating subroutines that sequentially generate the entire single hawk scream. The "submodules" are subroutines that correspond to the blocks 61–72 of the flowchart of FIGS. 5C and 5D and can be sequentially executed by microcontroller 31 to generate electrical signals which cause piezoelectric transducer 6 to reproduce the original hawk scream. The term "submodules" also refers to the sections of the waveform of FIG. 5A identified by reference numerals 61–72 along the horizontal time axis. In FIG. 5A, a beginning of each of the sections of the waveform is indicated by the same reference numeral that designates the particular submodule in FIGS. 5C and 5D that is executed by microprocessor 31 to cause piezoelectric transducer 6 to produce a corresponding portion of the hawk scream waveform.

Thus, a subroutine is made up for each submodule of the hawk scream waveform and the submodules are assembled within microprocessor 31 so that it can call up the major module and sequentially execute the submodules thereof to produce the electrical signals needed to cause driver circuit 35,36 and piezoelectric transducer 6 to sequentially reproduce the hawk sounds so as to reproduce the entire hawk sound.

Figure 5C:
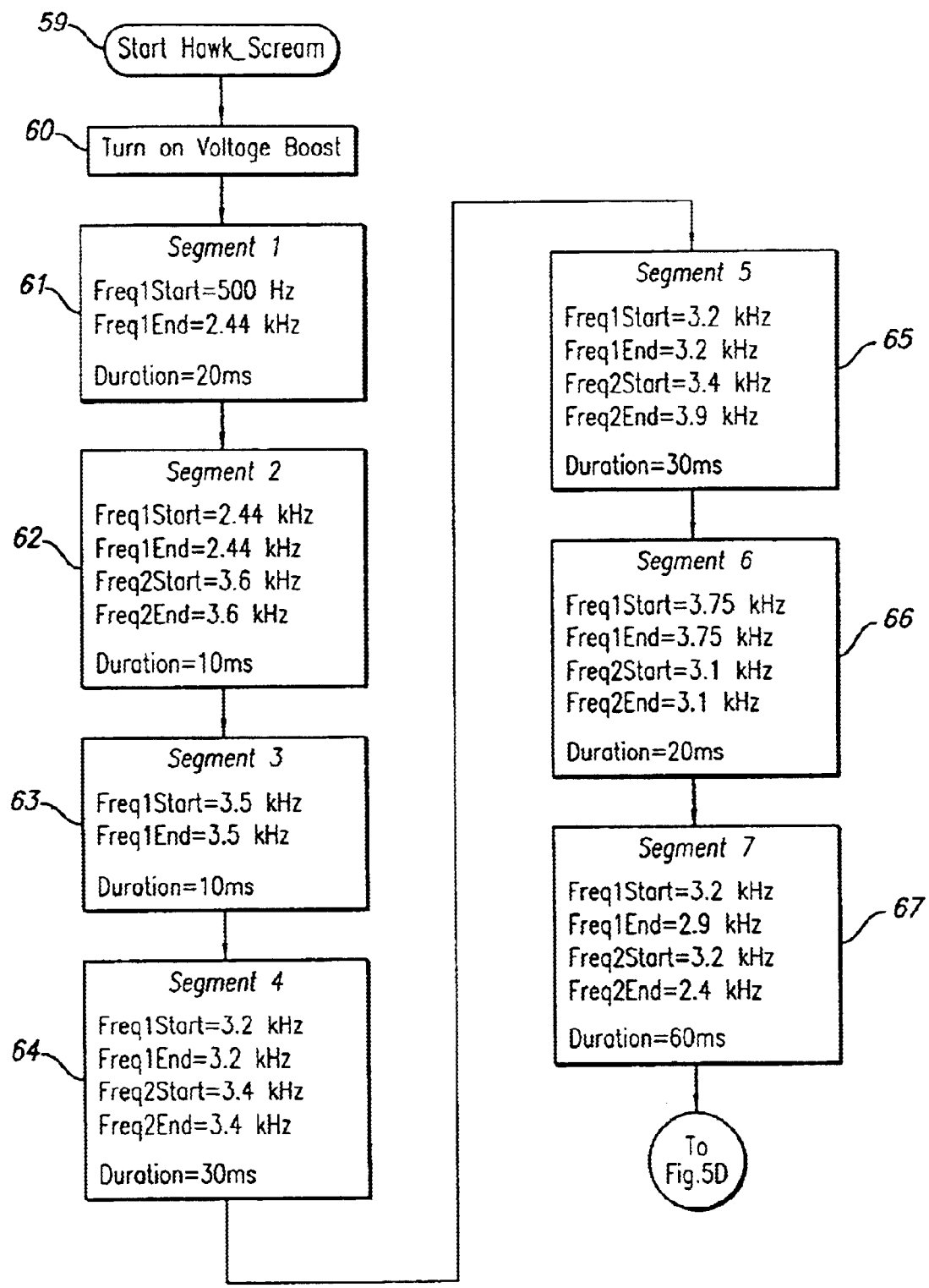
FIGS. 5C and 5D constitute a flow diagram of a sound-producing algorithm executed by a processor in the beeper unit of FIG. 1 to produce a realistic hawk screeching sound.
Figure 5D:
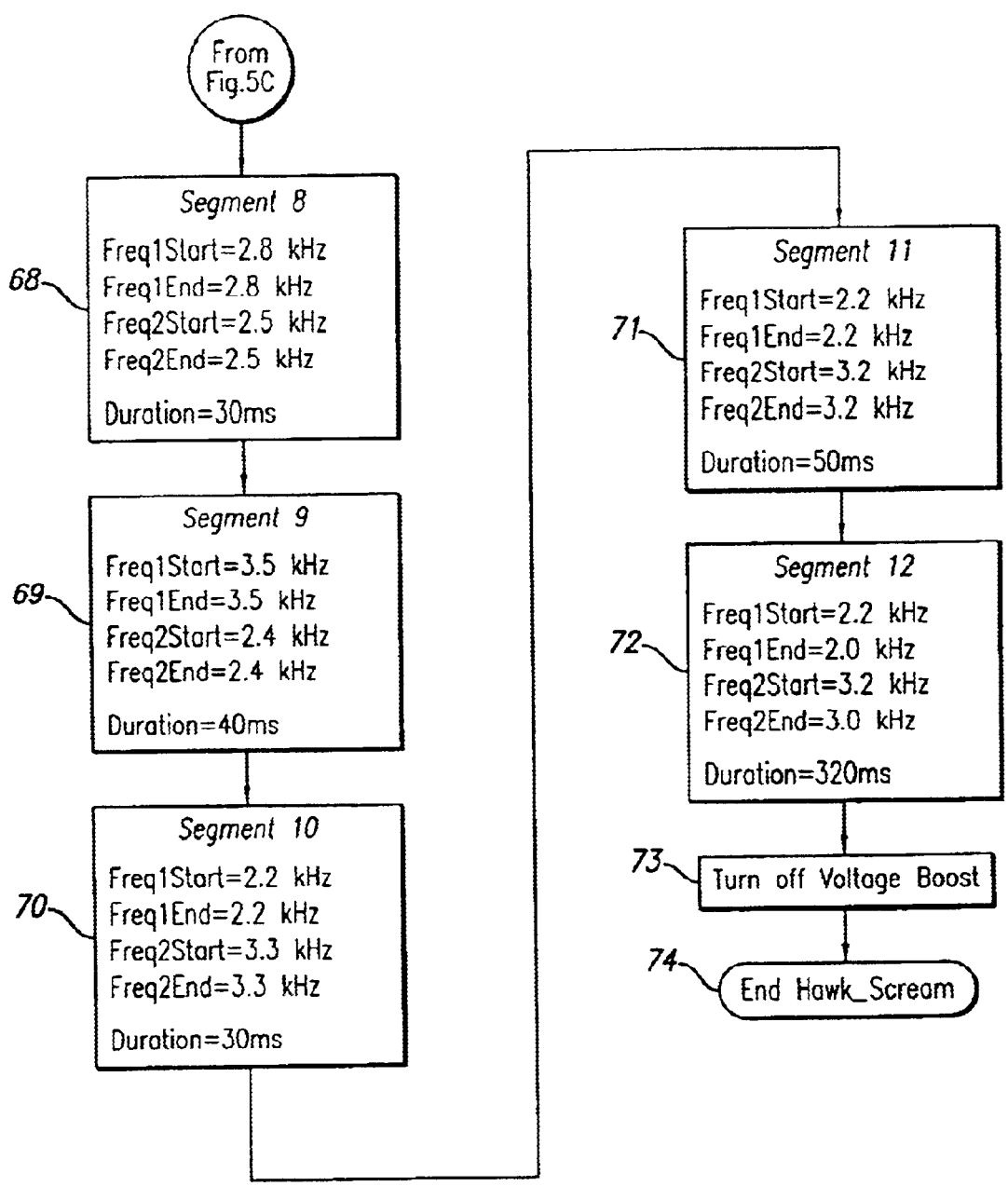

Referring next to FIGS. 5C and 5D, the hawk sound producing algorithm is entered at label 59 and goes directly to block 60, wherein microcontroller 31 enables voltage booster circuit 34 to produce the high amplitude drive signals required by piezoelectric transducer 6C. In block 61, the execution by microcontroller 61 of the subroutine or submodule corresponding to Segment 1 (between times 61 and 62 in FIG. 5A) generates digital data representing a frequency component signal having a frequency that initially is 500 Hz and gradually decreases to 2.44 kilohertz at the end of the 20 millisecond duration of Segment 1. Referring to block 62, microcomputer 31 then executes the submodule corresponding to Segment 2 (between times 62 and 63 in FIG. 5A) in order to generate data representing a first frequency component signal having a constant frequency of 2.44 kilohertz throughout the entire 10 millisecond duration of Segment 2 and a second frequency component signal having a constant frequency of 2.44 kilohertz throughout the 10 millisecond duration of Segment 2.

Note that in each of the subroutines or submodules 61–72, the first frequency component signal is designated Freq1 and the second frequency component signal, if there is one, is designated Freq2. The initial frequency of the first frequency component signal at the beginning of the duration of the submodule is designated Freq1 Start, and the ending frequency of the first frequency component signal at the end of the duration of the submodule is designated Freq2End. For the second frequency component signal, if there is one, the initial frequency at the beginning of the duration of the submodule is designated Freq2Start and the ending frequency at the end of the duration of the submodule is designated Freq2End.

Thus, in block 63, execution of the submodule Segment 3 results in producing data representative of a single frequency component having a constant 3.5 kHz frequency for the entire 10 millisecond duration of Segment 3. Referring to block 64, execution of the corresponding submodule produces data representing a first frequency component signal having a constant 3.2 kHz frequency and a second frequency component signal having a constant 3.4 kHz signal for the entire 30 millisecond duration of Segment 4. Referring to block 65, execution of the submodule corresponding to Segment 5 produces data representing a first frequency component signal having a constant 3.2 kHz frequency and a second frequency component signal having an initial frequency of 3.4 kHz and an ending frequency of 3.9 kHz at the end of the 30 millisecond duration of Segment 5. Referring to block 66, execution of the Segment 6 submodule produces data representing a first frequency component signal with a constant frequency of 3.75 kHz and a second frequency component signal with a constant 3.1 kHz frequency.

Execution of the submodule 67 corresponding to Segment 7 produces data representing a first frequency component signal having a frequency that begins at 3.2 kHz and decreases to 2.9 kHz at the end of the 60 millisecond duration of Segment 7, and also produces data representing a second frequency component signal having a frequency begins at 3.2 kHz and gradually decreases to 2.4 kHz at the end of the 60 millisecond duration of Segment 7. Execution of the submodule of Segment 8 in block 68 produces data representing a first frequency component signal having a constant frequency of 2.8 kHz and a second frequency component signal having a constant frequency of 2.5 kHz for the entire 30 millisecond duration of Segment 8. Execution of the submodule in block 69 for Segment 9 produces data representing first and second frequency signal components having constant frequencies of 3.5 kHz and 2.4 kHz, respectively, for the entire 40 millisecond duration of Segment 9. Execution of the submodule in block 70 for Segment 10 produces data representing first and second frequency signal components having constant frequencies of 2.2 kHz and 3.3 kHz, respectively, for the entire 30 millisecond duration of Segment 10. Execution of the submodule in block 71 for Segment 11 produces data representing first and second frequency signal components having constant frequencies of 2.2 kHz and 3.2 kHz, respectively, for the entire 50 millisecond duration of Segment 11. Finally, execution of the submodule in block 72 for Segment 12 produces data representing a first frequency component signal having an initial frequency of 2.2 kHz and an ending frequency of 2.0 kHz at the end of the 320 millisecond duration of Segment 12 and also representing a second frequency component signal having an initial frequency of 3.2 kHz and an ending frequency of 3.0 kHz the end of the 320 millisecond duration of Segment 12. In block 73, microcontroller 31 disables voltage booster circuit 34 and exits the hawk sound algorithm at label 74.

Attached Appendix 1 includes a list of instructions executed by microcontroller 31 to execute the algorithm of FIGS. 5C–D. The instructions are written in the programming language C.

The use of the above described the circuitry in FIGS. 4A and 4B and the sound-producing algorithm of FIGS. 5C and 5D provides much better results and is less costly than the above described prior art approach of using a repetitive capacitive discharge to modulate the sound signals utilized to simulate a hawk sound. The use of the piezoelectric transducer in combination with the mylar cone results in a higher achievable peak sound volume and a better quality sound representation of the hawk scream, especially the low frequencies components thereof, than has been previously available for any known beeper unit, and more accurately reproduces natural sounds and harmonics than a piezoelectric device without the mylar cone, and also results in a waterproof sound transducer structure the vibration of which automatically ejects water and debris that accumulate thereon. Furthermore, the use of piezoelectric transducer 6C in combination with mylar cone 6B results in a low cost sound transducer that is more robust and durable than the speaker units utilized in similar prior beeper units.

The described invention provides the advantage of low-cost and lower power consumption by the piezoelectric sound transducer and a flat frequency response characteristic and good sound qualities usually associated with a good speaker. This, in combination with the above described sound-producing algorithm, inexpensively results in excellent quality natural sounds, such as a hawk screeching sound, in the vicinity of the dog wearing the beeper unit. Utilization of the mylar cone 6B results in a "flatter" frequency characteristic response or tonal response and also in higher maximum output sound volume of the piezoelectric transducer. The use of piezoelectric transducer 6C in combination with mylar cone 6A and the acoustic chamber provided by horn base 5A and cover 5B to provide a "Helmholtz resonator" provides the benefit of a higher achievable peak sound volume than has been previously available for any known beeper unit. The modular characteristic of the described horn 5 allows the mylar cone piezoelectric device 6 to be readily interchanged with a different piezoelectric device having a desired different frequency characteristic. This allows the beeper unit 1 to be used in a wider variety of environmental conditions and for a wider number of dog training experiences or hunting experiences.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention.

For example, the sound producing algorithm might produce realistic sounds for other purposes, for example to get the attention of a dog being trained immediately prior to actuating a releaser device that propels a training object into the air. Also, the described embodiments of the invention can be combined with a receiver or circuit and a remote transmitter to allow the sound of the beeper unit to be remotely turned on or off.

APPENDIX 1

```
// Hawk Scream Code Routine
//
// Written by Tim Crist circa July 2000
// Routine turns on boost control and modulates a port pin to
// approximate the sound of a hawk scream on a low side driven
// piezo element.
//
// PIN_B5 = base of digital sound drive transistor
// PIN_RA2 = boost enable pin
// Timer0 set to 1:256 or roughly 0.25 ms per count
int p;
void HawkScream(void)
output_high(PIN_RA2);                    // on boost converter for volume
{
segment1
    p=0;                                 // initialize inc/dec counter
    timer0=0                             // initialize timer0
    while (timer0 <= 80)  {              // Set Approx. 20 ms (0.25 ms * 80)
        output_high(PIN_B5)              //
        delay_us(500 - 8*p);             // start F1 at 500 hz and rapidly increase Freq
        output_low((PIN_B5)
        delay_us(500 - 8*p);             // keep F2 = F1
        + +p;
    }
    dly_ms(10);                          // slight pause
segment2
    timer0=0                             // initialize timer0
    while (timer0 <= 40)  {              // Set Approx. 10 ms (0.25 ms * 40)
        output_high(PIN_B5)
        delay_us(102);                   // start F1 2.44 Khz
        output_low((PIN_B5)
        delay_us(69);                    // F2 = 3.6 Khz
    }  // end segment 2
Segment3
    timer0=0                             // initialize timer0
    while (timer0 <= 40)  {              // Set Approx. 10 ms (0.25 ms * 40)
        output_high(PIN_B5)              //
        delay_us(102);                   // F1 = 2.44 Khz
        output_low((PIN_B5)
        delay_us(71);                    // F2 = F1
    }  // end segment 3
Segment4
    timer0=0                             // initialize timer0
    while (timer0 <= 120)  {             // Set Approx. 30 ms (0.25 ms * 120)
        output_high(PIN_B5)              //
        delay_us(78);                    // F1 = 3.2 Khz
        output_low((PIN_B5)
        delay_us(73);                    // F2 = F1 3.4 Khz
    }  // end segment 4
Segment5
    p=0;                                 // initialize inc/dec counter
    timer0=0                             // initialize timer0
    while (timer0 <= 120)  {             // Set Approx. 30 ms (0.25 ms * 120)
        output_high(PIN_B5)              //
        delay_us(102);                   // F1 2.44 Khz
        output_low((PIN_B5)
        delay_us(73 - p);                // start F2 = 3.6 Khz increase to ~3.9 Khz
        + +p;
    }  // end segment 5
Segment6
    timer0=0                             // initialize timer0
```

APPENDIX 1-continued

```
        while (timer0 <= 80) {             // Set Approx. 20 ms (0.25 ms * 80)
            output_high(PIN_B5)            //
            delay_us(67);                  // F1 = 3.75 Khz
            output_low((PIN_B5)
            delay_us(81);                  // F2 = 3.1 Khz increase to ~3.9 Khz
        } // end segment 6
Segment7
        p=0;                               // initialize inc/dec counter
        timer0=0                           // initialize timer0
        while (timer0 <= 240) {            // Set Approx. 60 ms (0.25 ms * 240)
            output_high(PIN_B5)            //
            delay_us(78 + ceil(0.5*p));    // F1 3.2 Khz and decreasing (slowly)
            output_low((PIN_B5)
            delay_us(78 + p);              // F2 = 3.2 Khz and decreasing
            + +p;
        } // end segment 7
Segment8
        timer0=0                           // initialize timer0
        while (timer0 <= 120) {            // Set Approx. 30 ms (0.25 ms * 120)
            output_high(PIN_B5)            //
            delay_us(89);                  // F1 = 2.8 Khz
            output_low((PIN_B5)
            delay_us(100);                 // F2 = 2.5 Khz
        } // end segment 8
Segment9
        timer0=0                           // initialize timer0
        while (timer0 <= 160) {            // Set Approx. 40 ms (0.25 ms * 160)
            output_high(PIN_B5)            //
            delay_us(71);                  // F1 = 3.5 Khz
            output_low((PIN_B5)
            delay_us(104);                 // F2 = 2.4 Khz
        } // end segment 9
Segment10
        timer0=0                           // initialize timer0
        while (timer0 <= 120) {            // Set Approx. 30 ms (0.25 ms * 120)
            output_high(PIN_B5)            //
            delay_us(114);                 // F1 = 2.2 Khz
            output_low((PIN_B5)
            delay_us(76);                  // F2 = 3.3 Khz
        } // end segment 10
Segment11
        timer0=0                           // initialize timer0
        while (timer0 <= 200) {            // Set Approx. 50 ms (0.25 ms * 200)
            output_high(PIN_B5)            //
            delay_us(114);                 // F1 = 2.2 Khz
            output_low((PIN_B5)
            delay_us(78);                  // F2 = 3.1 Khz
        } // end segment 11
Segment12
        p=0;                               // initialize inc/dec counter
        for (i=1;i<=8;+ +i) {              // Loop last segment multiple times to get 320 ms
            + +p;                          // (timer max timeout is 64 ms)
            timer0=0                       // reset timer
            while ( timer0 <= 160) {       // 160 * 0.25 ms = 40 ms
                output_high(PIN_B5)
                delay_us(226 + 4*p);       // start at 2.2 Khz and slowly decrease F1
                output_low((PIN_B5)
                delay_us(77);              //start and end F2 at 3.2 Khz
            }
        }
        output_low(PIN_RA2);               // turn off voltage booster (volume)
}                                          // End HawkScream Routine
```

What is claimed is:

1. A collar-mounted animal training device, comprising:

(a) a housing supported by a collar;

(b) a piezoelectric transducer device attached to the housing, the piezoelectric transducer device including
  i. a piezoelectric transducer, and
  ii. a mylar cone acoustic element having a base portion connected to the piezoelectric transducer;

(c) a transducer housing for enclosing the piezoelectric transducer device, the transducer housing including a hollow section having an upper edge portion supporting an annular peripheral portion of the mylar cone acoustic element of the mylar cone acoustic element, and ii. a cover attached to cover the hollow section, the cover having an opening surrounded by an annular portion which clamps the annular peripheral portion of the mylar cone acoustic element between the cover and the upper edge of the hollow section.

2. A collar-mounted animal training device, comprising:

(a) a housing supported by a collar;

(b) a piezoelectric transducer device attached to the housing, the piezoelectric transducer device including i. a piezoelectric transducer, and ii. a mylar cone acoustic element having a base portion connected to the piezoelectric transducer;

(c) a transducer housing for enclosing the piezoelectric transducer device, the transducer housing including i. a hollow section having an upper edge portion supporting an annular peripheral portion of the mylar cone acoustic element of the mylar cone acoustic element, and ii. a cover attached to cover the hollow section, the cover having an opening surrounded by an annular portion which clamps the annular peripheral portion of the mylar cone acoustic element between the cover and the upper edge of the hollow section; and (d) a circuit enclosed within the housing having first and second terminals connected to a first terminal and a second terminal of the piezoelectric transducer, the circuit being configured to produce drive signals causing the piezoelectric transducer device to emit a predetermined sound.

3. The collar-mounted animal training device of claim 2 wherein the circuit includes a microcontroller, a voltage booster circuit, and driver circuitry, the microcontroller having a control output coupled to a control input of the voltage booster circuit, the voltage booster circuit being powered by a battery voltage and being operative to produce a boosted voltage to the driver circuitry when the voltage booster circuit is enabled by the control output of the microcontroller, the microcontroller also producing a first signal that is applied as an input to the driver circuitry, the driver circuitry producing an output signal that is applied to the first terminal of the mylar cone piezoelectric device.

4. The collar-mounted animal training device of claim 3 wherein the driver circuit includes a high side driver circuit receiving the first signal as an input and producing the output signal on the first terminal of the mylar cone piezoelectric transducer device such that an upper limit of the output signal is determined by the boosted voltage.

5. The collar-mounted animal training device of claim 4 wherein the driver circuit includes a low side driver circuit receiving a second signal produced by the microcontroller and producing the output on the terminal of the mylar cone piezoelectric transducer device such that a lower limit of the output signal is determined by a ground reference voltage.

6. The collar-mounted animal training device of claim 3 wherein the microcontroller stores data representative of an animal sound and a program executed by the microcontroller to produce the first signal in response to the stored data so as to cause the mylar cone piezoelectric device to accurately reproduce the animal sound.

7. The collar-mounted animal training device of claim 6 wherein the program operates to cause the microcontroller to store data representing the animal sound in the form of a plurality of sequential segments, each segment including a start time, a duration, at least one start frequency and corresponding end frequency, and wherein the program also operates to cause the microcontroller to sequentially produce a plurality of output signal components each having a corresponding start time, duration, start frequency, and end frequency each determined by stored data for that segment.

8. A collar-mounted animal training device comprising:

(a) a piezoelectric transducer device attached to a mylar cone acoustic element mounted in a transducer housing configured as a resonant sound port;

(b) a microcontroller, a voltage booster circuit coupled to the microcontroller, and driver circuitry coupled to the booster circuit and the microcontroller for producing boosted electrical signals to the piezoelectric device; and (c) a program stored in the microcontroller and data representing a predetermined sound stored in the microcontroller, the data representing a plurality of sequential segments of the predetermined sound each having a corresponding start time, a corresponding duration, a corresponding start frequency, and a corresponding end frequency, wherein the microcontroller produces a plurality of sequential output signal components as inputs to the driver circuit, the sequential output signal components having the corresponding start times, durations, start frequencies, and end frequencies, respectively.

9. A sound producing device comprising:

(a) a piezoelectric transducer device attached to a mylar cone acoustic element mounted in a transducer housing configured as a resonant sound port;

(b) a microcontroller, a voltage booster circuit coupled to the microcontroller, and driver circuitry coupled to the booster circuit and the microcontroller for producing boosted electrical signals to the piezoelectric device; and (c) a program stored in the microcontroller and data representing a predetermined sound stored in the microcontroller, the data representing a plurality of sequential segments of the predetermined sound each having a corresponding start time, a corresponding duration, a corresponding start frequency, and a corresponding end frequency, wherein the microcontroller produces a plurality of sequential output signal components as inputs to the driver circuit, the sequential output signal components having the corresponding start times, durations, start frequencies, and end frequencies, respectively.

10. A method of producing a predetermined sound pattern, comprising:

(a) providing a sound transducer;

(b) providing a processor and driver circuitry coupled to the processor for producing electrical signals representative of the predetermined sound pattern to the sound transducer;

(c) storing a program stored in a memory associated with the processor, and storing in the memory data representing a plurality of sequential segments of the predetermined sound pattern, each segment having a corresponding start time, a corresponding duration, a corresponding start frequency, and a corresponding end frequency;

(d) operating the processor to execute the program to produce a plurality of sequential output signal components as inputs to the driver circuitry, the sequential output signal components having the corresponding start times, durations, start frequencies, and end frequencies, respectively.

11. The method of claim 10 including producing the data by:

1) providing data representing the predetermined sound pattern in a digital format;

2) entering the data in the digital format into a sound editing program and executing the sound editing program to convert the data in the digital format into a format suitable for a fast Fourier transform analysis;

3) segmenting data produced by the sound editing program into the plurality of sequential segments of the predetermined sound pattern;

4) performing the Fourier transform analysis on the data within each segment to produce data identifying primary frequency components in each of the plurality of sequential segments;

5) analyzing the primary frequency components in each of the plurality of sequential segments to determine the start times, durations, start frequencies, and end frequencies.

12. A system for producing a predetermined sound pattern, comprising:
   (a) a sound transducer;
   (b) a processor and driver circuitry coupled to the processor for producing electrical signals representative of the predetermined sound pattern to the sound transducer;
   (c) a memory associated with the processor storing a program and also storing data representing a plurality of sequential segments of the predetermined sound pattern, each segment having a corresponding start time, a corresponding duration, a corresponding start frequency, and a corresponding end frequency; and
   (d) means for operating the processor to execute the program to produce a plurality of sequential output signal components as inputs to the driver circuitry, the sequential output signal components having the corresponding start times, durations, start frequencies, and end frequencies, respectively.

13. The system of claim 12 including means for producing the data, including:
   1) means for providing data representing the predetermined sound pattern in a digital format;
   2) sound editing means for operating on the data in the digital format to convert the data in the digital format into a format suitable for a fast Fourier transform analysis;
   3) means for segmenting data produced by the sound editing program into the plurality of sequential segments of the predetermined sound pattern;
   4) means for performing the fast Fourier transform analysis on the data within each segment to produce data identifying primary frequency components in each of the plurality of sequential segments;
   5) means for analyzing the primary frequency components in each of the plurality of sequential segments to determine the start times, durations, start frequencies, and end frequencies.

* * * * *